United States Patent [19]
Fujimori et al.

[11] Patent Number: 5,142,902
[45] Date of Patent: Sep. 1, 1992

[54] TWIN ROLLER CHASSIS DYNAMOMETER

[75] Inventors: Sadao Fujimori, Tokyo; Akira Yamamoto, Gunma, both of Japan

[73] Assignee: Kabushiki Kaisha Meidensha, Tokyo, Japan

[21] Appl. No.: 706,993

[22] Filed: May 29, 1991

[30] Foreign Application Priority Data

May 30, 1990 [JP] Japan .................. 2-140762

[51] Int. Cl.$^5$ .............................................. G01L 3/02
[52] U.S. Cl. .................................... 73/117; 73/862.17
[58] Field of Search ............. 73/117, 123, 126, 862.17

[56] References Cited
U.S. PATENT DOCUMENTS
5,063,773 11/1991 Fujimori et al. ................ 73/117

FOREIGN PATENT DOCUMENTS
86024 5/1982 Japan ................... 73/117

Primary Examiner—Jerry W. Myracle
Attorney, Agent, or Firm—Bachman & LaPointe

[57] ABSTRACT

A twin roller type chassis dynamometer includes two coxially arranged load rollers and two coaxially free rollers. The two pairs of rollers are arranged parallel to one another. One of the free rollers includes an outer rotor dynamometer. The rotor of this device is connected by way of a belt drive with one of the load rollers in a manner which produces a step-up gearing and drives the rotor faster than the load roller.

3 Claims, 2 Drawing Sheets

TWIN ROLLER CHASSIS DYNAMOMETER

BACKGROUND OF THE INVENTION

1. Field of the Invention

The present invention relates generally to a dynamometer and more specifically to a twin roller type chassis dynamometer.

2. Description of the Prior Art

Twin roller type chassis dynamometers are usually of the type wherein the vehicle is driven onto the same and used for a wide variety of purposes such as determining exhaust gas emission characteristics, fuel consumption and the like.

However, in order to be able to provide satisfactory simulation characteristics it is necessary the device be able to produce running resistance, variable load, and the like.

In order to vary the load, a twin roller type chassis dynamometer of the type shown in FIG. 2 has been used. In this illustrated arrangement, in view of space efficiency and cost requirements, the rollers are arranged to have a diameter of about 500 mm and the free roller is provided internally with a fly wheel which can rotate faster than the same.

As shown, this prior art twin roller type dynamometer includes a roller dynamometer 1, a load roller 2 and two free rollers 3 and 4. The roller dynamometer and the load roller 2 are connected by way of a coupling shaft 6 and brake 6 so as to undergo synchronous rotation. The two free rollers 3 and 4 are interconnected by way of coupling shaft 7 and brake 8 and are arranged to rotate synchronously. Roller dynamometer 1 and free roller 3 are arranged in parallel. Load roller 2 and free roller 4 are similarly arranged.

The chassis dynamometer is further provided with a clutch 9 which is operatively connected to an output shaft 10 of the load roller 2. The output shaft 11 of the free roller 4 is connected with the output shaft 10 by way of a timing belt 12.

Flywheels 13 and 14 are disposed within each of the free rollers 3 and 4. Each of these flywheels 13 and 14 are arranged so that they can rotate faster than the respective free rollers in which they are housed.

However, this arrangement has suffered from the drawback that, in order to render the overall arrangement compact, that the dynamometer device must be disposed within the roller dynamometer 1.

As a result, as the diameter of the roller dynamometer 1 is limited and the rotational speed of the load roller 2 cannot be varied, the amount by which the load can be varied is limited to a maximum of about 75 KW.

However, high speed large displacement engines currently tend to produce in the order of 220 KW. Therefore, the above type of twin roller type chassis dynamometer does not exhibit the capacity required for suitably testing vehicles fitted with such powerful large displacement engines.

In order to permit the capacity of the device to be increased, it is necessary to replace the existing dynamometer with a larger one. However, this requires an increased amount of space and increases the cost of the arrangement.

SUMMARY OF THE INVENTION

It is an object of the present invention to provide a twin roller type chassis dynamometer which features a largely increased capacity and which is desirably compact.

In brief, the above object is achieved by a twin roller type chassis dynamometer includes two coaxially arranged load rollers and two coaxially free rollers. The two pairs of rollers are arranged parallel to one another. One of the free rollers includes an outer rotor type dynamometer. The rotor of this device is connected by way of a belt drive with one of the load rollers in a manner which produces a step-up gearing and drives the rotor faster than the load roller.

More specifically, a first aspect of the present invention comes in a twin roller type chassis dynamometer which features: a load roller; a free roller; an outer rotor type dynamometer disposed within the free roller, dynamometer having a rotor which is rotatably supported within the free roller; and drive means for interconnecting the rotor of the dynamometer with the load roller and for driving the rotor to rotate at a higher rotational speed than the load roller.

A second aspect of the present invention comes in a twin roller type chassis dynamometer which features: two coaxially arranged load rollers; two coaxially free rollers, the two load rollers being arranged parallel to the two free rollers; an outer rotor type dynamometer disposed in one of the free rollers, said dynamometer having a rotor; and belt drive means which establishes a drive connection between the rotor of said dynamometer and one of the load rollers and which produces a step-up gearing and drives the rotor faster than the load roller to which it is connected.

A further aspect of the invention comes in that the above type of dynamometer features the arrangement wherein the rotor has a first shaft which extends out of a first end of the free roller in which it is disposed, the belt drive includes a drive belt gear which is supported on the first shaft; first bearing means support the first shaft on a base; second bearing means supporting a first end of the free roller on the first shaft; a stator which forms part of the dynamometer; a second shaft which is connected to the stator, the second shaft being hollow and arranged to have stator lead lines disposed therethrough; third bearing means for allowing the second shaft to pass through a second end of the free roller in which the stator is disposed, the third bearing means having a tubular portion through which the second shaft passes; fourth bearing means supporting a second end of the free roller on an inboard end of the tubular portion of the third bearing means; and fifth bearing means for supporting an outboard end of tubular portion of the third bearing means on the base.

DESCRIPTION OF THE PREFERRED EMBODIMENTS

Figure 1:
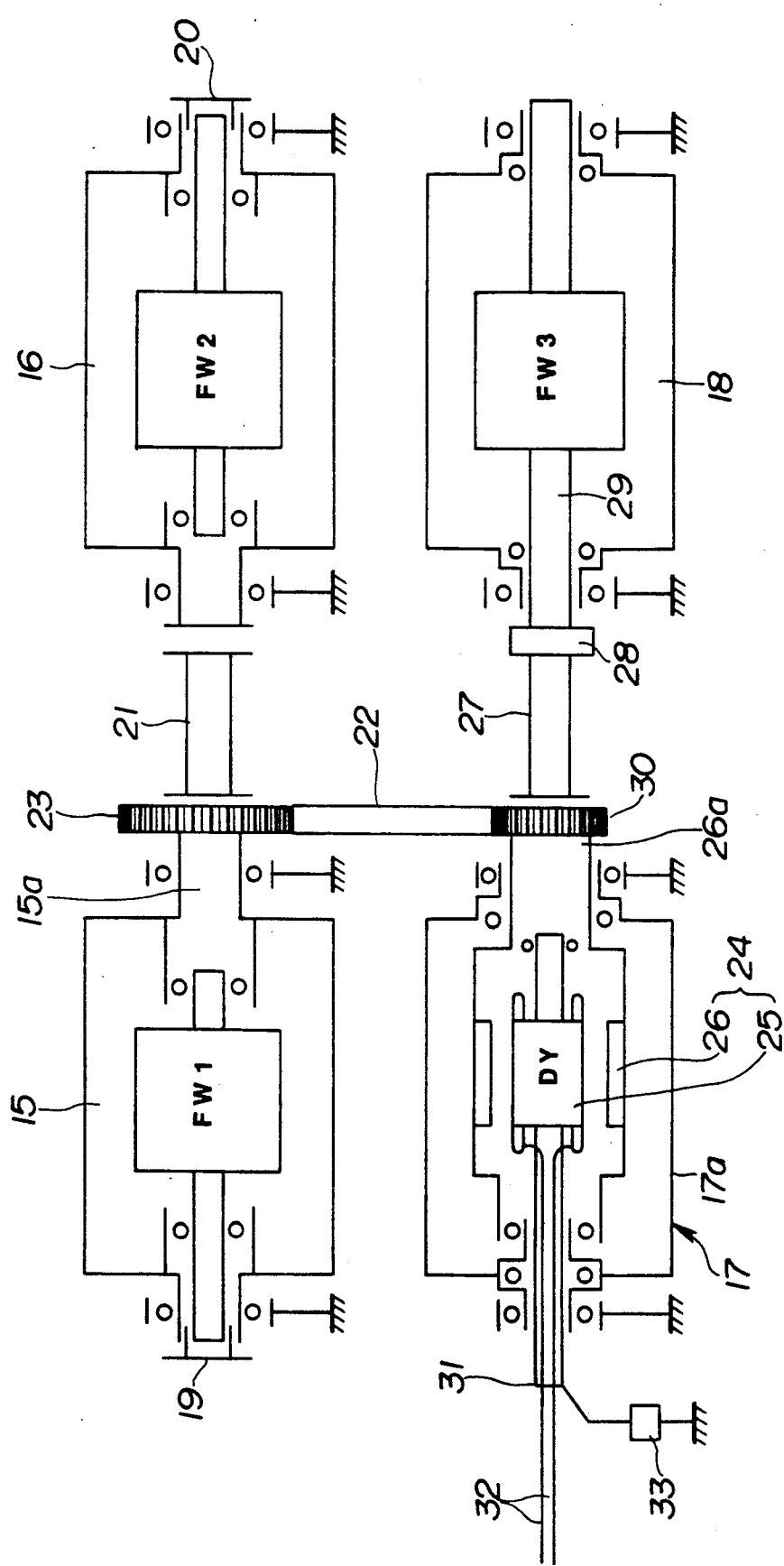
FIG. 1 shows a embodiment of the present invention.
Figure 2:
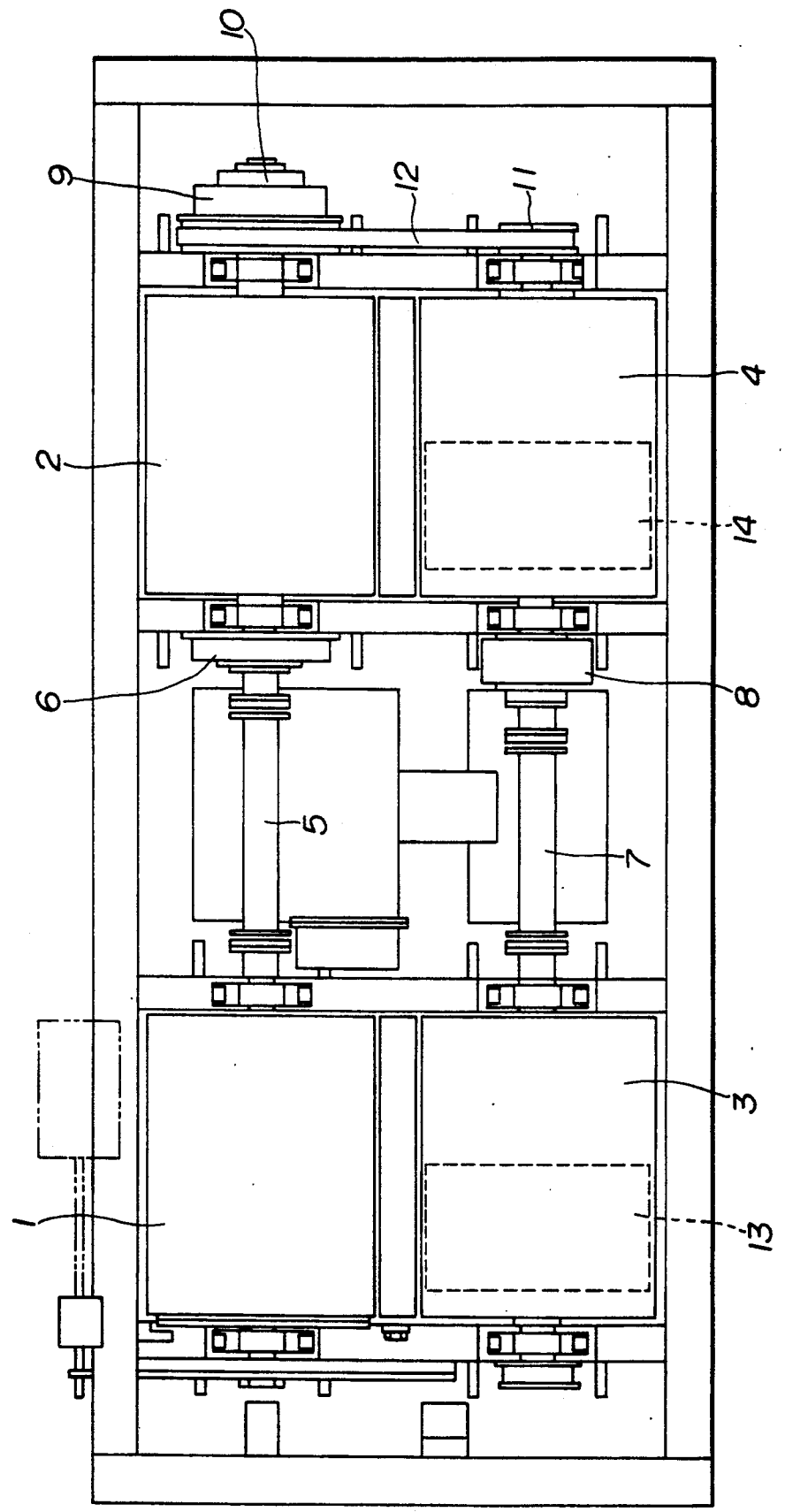
FIG. 2 shows the prior art arrangement discussed in the opening paragraphs of the instant disclosure.

FIG. 1 shows in schematic outline form, the arrangement which characterizes an embodiment of the present invention.

In this arrangement 15 and 16 denote load rollers which each contain flywheels (FW1, FW2), 17 denotes a free roller containing an outer rotor type dynamometer, and 18 denotes a free roller which includes a flywheel therein.

The flywheels FW1 and FW2 included in the load rollers 15 and 16 are arranged for vehicular simulation. The flywheel FW1 and the load roller 15 in which it is housed, are selectively connectable via a clutch 19. In a similar manner, a clutch 20 is arranged to establish a drive connection between the flywheel FW2 and the load roller 16 which houses the same.

The free roller 17 which houses the dynamometer and the free roller 18 in which the flywheel FW3 is housed, are arranged coaxially. The dynamometer device which is disposed in the free roller 17 includes an outer rotor 24 which rotates about a stator 25 and a rotor 26. The rotor 26 includes a shaft 26a is connected by way of a coupling 27 and a clutch 28 to the main shaft 29 of the flywheel FW3.

A coupling 21 is disposed coaxially between the load rollers 15 and 16 in a manner which establishes a connection therebetween.

A first timing belt gear 23 is mounted on the shaft 15a of the load roller 15 and connected by way of a timing belt 22 to a second timing belt gear 30 which is mounted on the rotor shaft 26a. The gear 30 is smaller in diameter than gear 23 and thus drives the rotor 26 at a rotational speed which is higher than that of the load roller 15.

Lead lines 32 are arranged to pass through a hollow support shaft 31 on which the stator 25 is supported, and to be connected at the inboard ends to the stator.

It should be noted that a torque detection device 33 is operatively connected with the stator 25.

Free roller 17 is supported both on a frame arrangement and on outer rotor dynamometer 24 in a manner which suitably isolates the arrangement from heat and vibration.

As the free roller 17 and the rotor 26 undergo rotation at different speeds they are supported independently of one another.

What is claimed is:

1. In a twin roller type chassis dynamometer
   a load roller;
   a free roller;
   an outer rotor type dynamometer disposed within said free roller, said dynamometer having a rotor which is rotatably supported within said free roller; and
   drive means for interconnecting the rotor of the dynamometer with said load roller and for driving the rotor to rotate at a higher rotational speed than said load roller.

2. A twin roller type chassis dynamometer comprising:
   two coaxially arranged load rollers;
   two coaxially free rollers, the two load rollers being arranged parallel to the two free rollers;
   an outer rotor type dynamometer disposed in one of the free rollers, said dynamometer having a rotor; and
   belt drive means which establishes a drive connection between the rotor of said dynamometer and one of the load rollers and which produces a step-up gearing and drives the rotor faster than the load roller to which it is connected.

3. A twin roller type chassis dynamometer as claimed in claim 2 wherein:
   said rotor has a first shaft which extends out of a first end of the free roller in which it is disposed;
   said belt drive includes a drive belt gear which is supported on the first shaft;
   first bearing means support said first shaft on a base;
   second bearing means supporting a first end of the free roller on the first shaft;
   a stator which forms part of said dynamometer;
   a second shaft which is connected to the stator, said second shaft being hollow and arranged to have stator lead lines disposed therethrough;
   third bearing means for allowing the second shaft to pass through a second end of the free roller in which the stator is disposed, the third bearing means having a tubular portion through which the second shaft passes;
   fourth bearing means supporting a second end of the free roller on an inboard end of the tubular portion of the third bearing means; and
   fifth bearing means for supporting an outboard end of tubular portion of the third bearing means on the base.

* * * * *